United States Patent
Filali-Adib et al.

(10) Patent No.: US 8,607,039 B2
(45) Date of Patent: Dec. 10, 2013

(54) ISOLATION OF DEVICE NAMESPACE TO ALLOW DUPLICATE/COMMON NAMES IN ROOT VOLUME GROUP WORKLOAD PARTITIONS

(75) Inventors: Khalid Filali-Adib, Austin, TX (US); Perinkulam I. Ganesh, Round Rock, TX (US); Paul D. Mazzurana, Austin, TX (US); Edward Shvartsman, Austin, TX (US); Sungjin Yook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 12/857,899

(22) Filed: Aug. 17, 2010

(65) Prior Publication Data

US 2012/0047356 A1 Feb. 23, 2012

(51) Int. Cl.
*G06F 9/00* (2006.01)
*G06F 15/177* (2006.01)

(52) U.S. Cl.
USPC .............................................. 713/2; 711/173

(58) Field of Classification Search
USPC .............................................. 713/2; 711/173
See application file for complete search history.

(56) References Cited

U.S. PATENT DOCUMENTS

| | | | |
|---|---|---|---|
| 4,779,196 A | 10/1988 | Manga | |
| 6,526,447 B1 | 2/2003 | Giammaria | |
| 6,795,966 B1 | 9/2004 | Lim et al. | |
| 6,934,755 B1 | 8/2005 | Saulpaugh et al. | |
| 6,940,835 B2 | 9/2005 | Reza et al. | |
| 7,020,758 B2 | 3/2006 | Fisk | |
| 7,058,764 B2 | 6/2006 | Bearden | |
| 7,093,120 B2 | 8/2006 | Keohane et al. | |
| 7,191,440 B2 | 3/2007 | Cota-Robles et al. | |
| 7,191,441 B2 | 3/2007 | Abbott et al. | |
| 7,251,747 B1 | 7/2007 | Bean et al. | |
| 7,281,108 B2 | 10/2007 | Todd | |
| 7,389,512 B2 | 6/2008 | Tucker | |
| 7,443,878 B2 | 10/2008 | Hendel et al. | |
| 7,489,690 B2 | 2/2009 | Kakadia | |
| 7,546,602 B2 | 6/2009 | Hejlsberg et al. | |
| 2003/0172160 A9 | 9/2003 | Widegren et al. | |
| 2004/0243796 A1 | 12/2004 | Keohane et al. | |
| 2005/0257080 A1 | 11/2005 | Santos et al. | |

(Continued)

OTHER PUBLICATIONS

USPTO U.S. Appl. No. 12/208,619.

(Continued)

*Primary Examiner* — Chun Cao
*Assistant Examiner* — Xuxing Chen
(74) *Attorney, Agent, or Firm* — Stephen R. Tkacs; Stephen J. Walder, Jr.; Libby Z. Toub

(57) ABSTRACT

A mechanism is provided for isolation of device namespace to allow duplicate or common names in root volume group workload partitions. The mechanism creates a scratch file system that contains enough information to create an execution environment for a workload partition and information about which physical volumes to use for the root volume group file systems. The mechanism then populates the root file systems on a disk in the global space. The mechanism boots the workload partition from the scratch file system and configures the devices to be exported to the workload partition based information in the scratch file system. The mechanism then renames the logical volume names to the traditional names. The mechanism then temporarily mounts the root volume group file system onto the scratch file system.

20 Claims, 4 Drawing Sheets

(56) References Cited

U.S. PATENT DOCUMENTS

| | | | |
|---|---|---|---|
| 2006/0184587 A1 | 8/2006 | Federwisch et al. | |
| 2006/0236127 A1 | 10/2006 | Kurien et al. | |
| 2007/0294578 A1 | 12/2007 | Qiao et al. | |
| 2008/0066143 A1 | 3/2008 | Tai et al. | |
| 2008/0077993 A1 | 3/2008 | Zimmer et al. | |
| 2008/0097858 A1 | 4/2008 | Vucina et al. | |
| 2008/0126579 A1 | 5/2008 | Corneli et al. | |
| 2008/0126792 A1* | 5/2008 | Herington et al. | 713/100 |
| 2008/0235388 A1 | 9/2008 | Fried et al. | |
| 2008/0320219 A1* | 12/2008 | Okada et al. | 711/114 |
| 2009/0089406 A1 | 4/2009 | Roush et al. | |
| 2009/0112969 A1 | 4/2009 | Ganesh et al. | |
| 2009/0177756 A1 | 7/2009 | Gunda et al. | |
| 2010/0064364 A1 | 3/2010 | Khan et al. | |
| 2010/0082816 A1 | 4/2010 | Kharat et al. | |
| 2010/0094948 A1 | 4/2010 | Ganesh et al. | |

OTHER PUBLICATIONS

USPTO U.S. Appl. No. 12/242,218.

USPTO U.S. Appl. No. 12/249,720.

"Enhanced Dual Boot Operating System Install Procedure with Early Boot Loader Checking", ip.com/IBM TDB, Jan. 17, 2006, 2 pages.

"PODER: wboot window to synchronize device attributes between WPAR and Gladbal space", www.ip.com, IPCOM000195864D, May 19, 2010, 3 pages.

"System and a Method to Optimize Scheduling Software Workload Partitions such as WPAR to Improve Performance", ip.com/IBM TDB; Feb. 19, 2009, 2 pages.

Andrade, Henrique et al., "Efficient Execution of Multiple Query Workloads in Data Analysis Applications", ACM Digital Library, Nov. 2001, pp. 1-11.

Bello, Adekunle et al., "Server Resource Allocation", U.S. Appl. No. 12/640,268, filed with the USPTO on Dec. 17, 2009, 23 pages.

Bhattiprolu, Sukadev et al., "Virtual Servers and Checkpoint/Restart in Mainstream Linux", ACM Digital Library, 2008-2009, pp. 104-113.

Butler, Kevin R. et al., "Rootkit-Resistant Disks", ACM Digital Library, Oct. 2008, pp. 403-415.

Carlson, BL et al., "Pre-Kitting Thin-Film Disks", ip.com/IBM TDB, Oct. 1, 1990, 2 pages.

Cunningham, EA et al., "Volumetric Density Increase Using Interleaved Disk Packs", ip.com/IBM TDB, Jul. 1, 1989, 3 pages.

Filali-Adib, Khalid et al., "Isolating Workload Partition Space", U.S. Appl. No. 12/620,873, filed with the USPTO on Nov. 18, 2009, 47 pages.

Filali-Adib, Khalid et al., "System for Improving a User-Space Environment", U.S. Appl. No. 12/581,866, filed with the USPTO on Oct. 19, 2009, 35 pages.

Kharat, Satish et al., "Migration of Software Partition in UNIX System", Proceedings of the 1st Bangalore Annual Computer COnference, 2008, 4 pages.

Lagar-Cavilla, H. Andres et al., "SnowFlock: Rapid Virtual Machine Cloning for Cloud Computing", ACM, Apr. 2009, pp. 1-10.

Lin, Wujuan et al., "WPAR: A Weight-based Metadata Management Strategy for Petabyte-scale Object Storage Systems", INSPEC/IEEE; current version 2008, pp. 99-106.

Lu, Lanyue et al., "Workload Decomposition for QoS in Hosted Storage Services", ACM Digital Library, Dec. 2008, pp. 19-24.

Nightingale, Edmund B. et al., "Speculative Execution in a Distributed File System", ACM Digital Library, Oct. 2005, pp. 191-205.

* cited by examiner

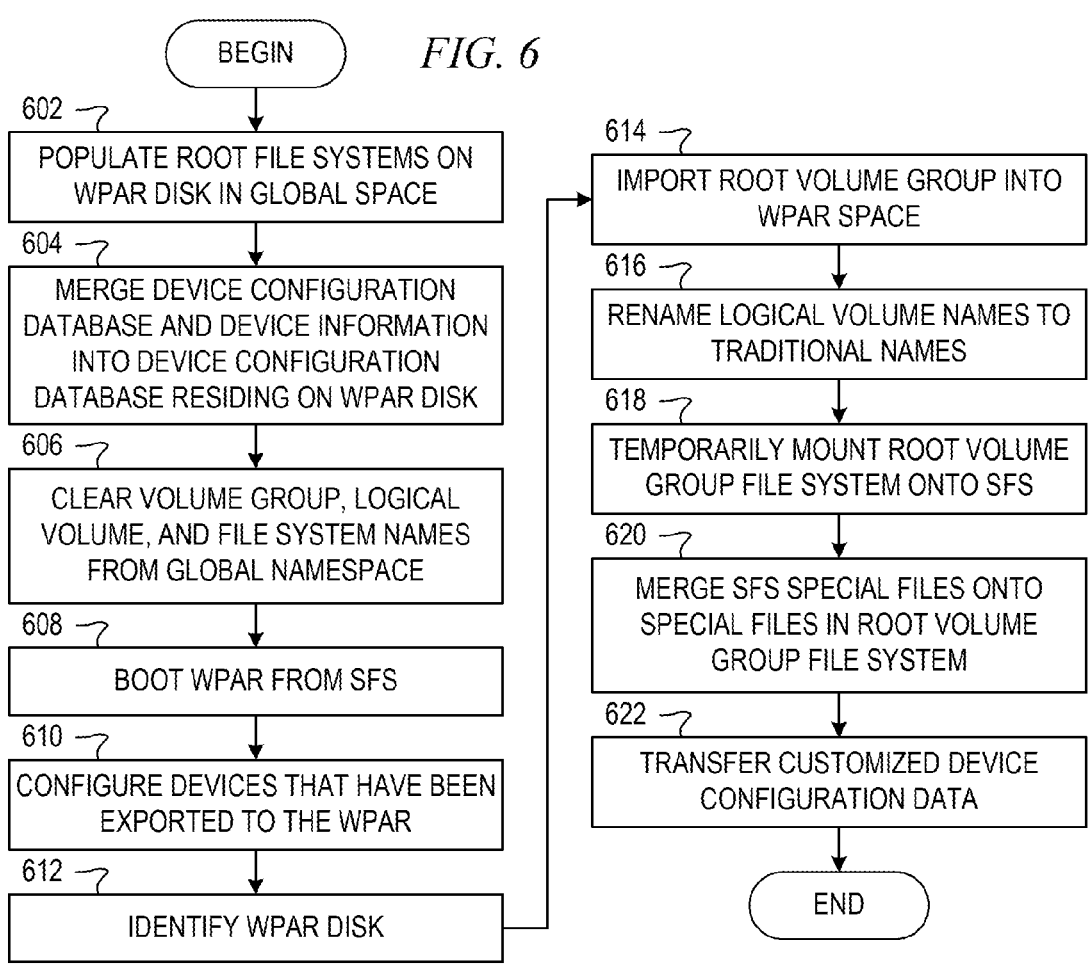

US 8,607,039 B2

ISOLATION OF DEVICE NAMESPACE TO ALLOW DUPLICATE/COMMON NAMES IN ROOT VOLUME GROUP WORKLOAD PARTITIONS

BACKGROUND

The present application relates generally to an improved data processing apparatus and method and more specifically to mechanisms for isolation of namespace to allow duplicate or common names in a root volume group workload partitions.

A software workload partition (WPAR) provides isolation of software services, applications, and administration utilizing flexible software-defined boundaries within a single instance of an operating system. A software partition has the look and feel of a stand-alone system. A WPAR can be booted, accessed and shut down like a stand-alone machine. The very first environment, the traditional operating system (OS), on top of which WPARs are created is called "the global," i.e. the global environment or the global operating system. Normally, for such partitions, the global stores the file system data and boot information on the local hard disks, and the global boots the WPARs from the local disks.

A WPAR shares the operating system and resources of the host data processing system. Resources accessible to the operating system of the host data processing system are said to belong to a "global space." An application executing in a WPAR may use the WPAR as if the WPAR were a complete data processing system. The application executes in the WPAR without the awareness that the WPAR, and consequently the application, is sharing resources in the global space of the host data processing system. More than one WPAR may share resources in the global space.

A WPAR is configured, started, operated, and eventually terminated in a host data processing system using resources in the global space. Resources utilized by the WPAR during these various stages remain visible, available, and accessible to the operating system of the host data processing system.

A WPAR should support physical storage devices. Once a device has been exported to a WPAR, the WPAR must have exclusive control over the device. The device can be "varied on" and "varied off" from within the WPAR without affecting the global. To "vary on" a device is to activate the device for use. Conversely, to "vary off" a device is to deactivate the device. New logical volumes can be created on the device.

SUMMARY

In one illustrative embodiment, a method, in a data processing system, is provided for isolation of device namespace in a root volume group workload partition. The method comprises populating, by a global operating system in the data processing system, root file systems on a workload partition disk in a global namespace associated with the global operating system. The method further comprises clearing, by the global operating system in the data processing system, volume group, logical volume, and file system names for the workload partition disk from the global namespace. The method further comprises booting, by the global operating system in the data processing system, a workload partition from a scratch file system. The scratch file system stores information for booting the workload tile system. The method further comprises configuring, by the global operating system in the data processing system, the workload partition disk with the root volume group. The method further comprises importing, by the global operating system in the data processing system, the workload partition disk into a workload partition namespace associated with the workload partition. The method further comprises renaming, by the global operating system in the data processing system, logical volume names of the root volume group in the workload partition namespace.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts an example of logical volume names that a root volume group WPAR supports in accordance with an example embodiment;

FIG. 6 is a flowchart illustrating operation of a mechanism for isolating device namespace to allow duplicate/common names in a root volume group workload partition in accordance with an illustrative embodiment.

DETAILED DESCRIPTION

The illustrative embodiments provide a mechanism for isolation of device namespace to allow duplicate or common names in root volume group workload partitions. The mechanism creates a scratch file system that contains enough information to create an execution environment for a workload partition and information about which physical volumes to use for the root volume group file systems. The mechanism then populates the root file systems on a disk in the global space. The mechanism boots the workload partition from the scratch file system and configures the devices to be exported to the workload partition based information in the scratch file system. The mechanism then renames the logical volume names to the traditional names. The mechanism then temporarily mounts the root volume group file system onto the scratch file system.

Figure 1:
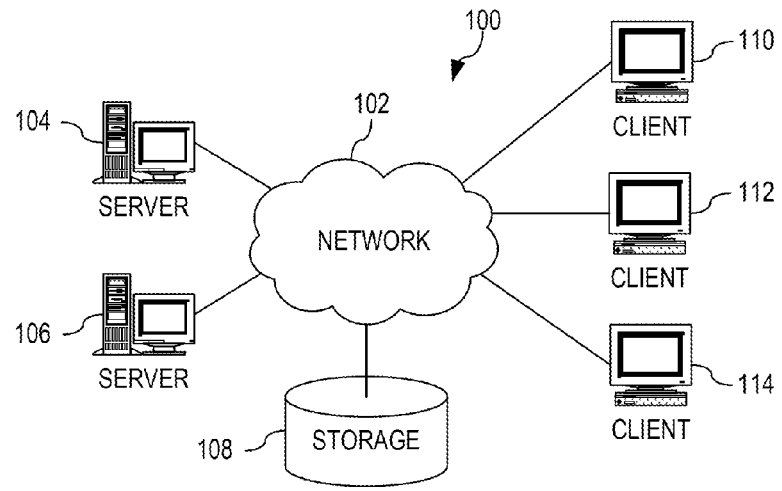
FIG. 1 depicts a pictorial representation of an example distributed data processing system in which aspects of the illustrative embodiments may be implemented.
Figure 2:
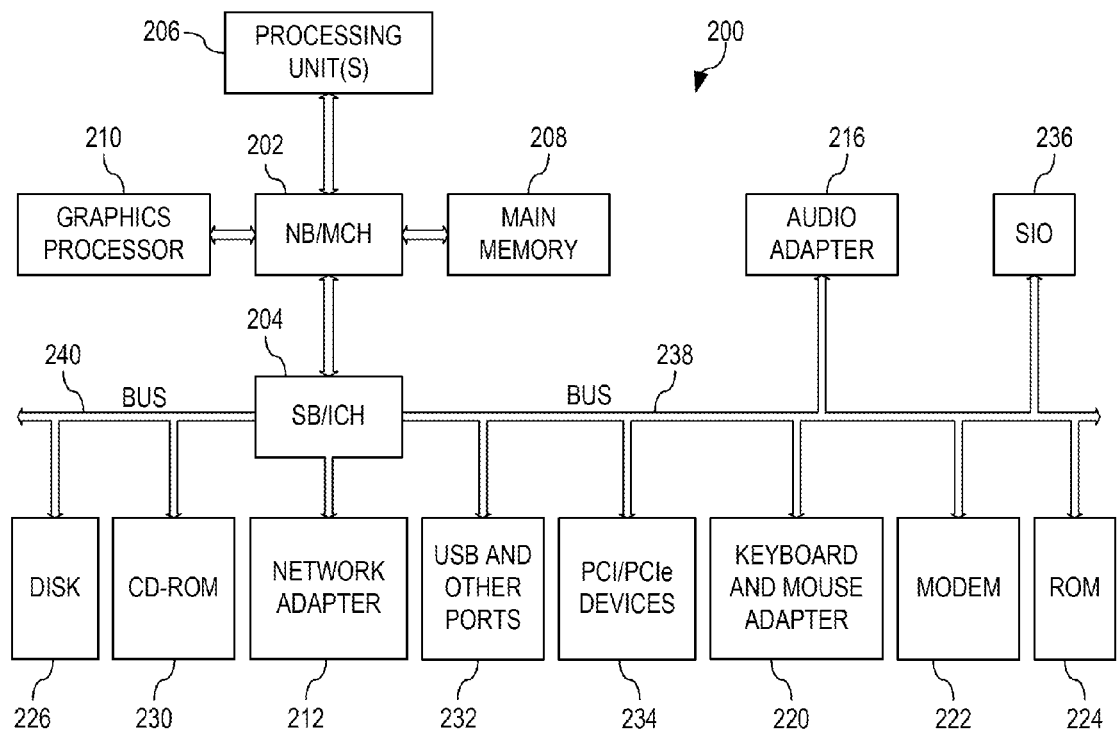
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments. FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may he made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/TCH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network. (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example. Ethernet adapters, add-in cards, and PC cards for notebook computers. PCI uses a card bus controller, while PCIe does not. ROM 224 may be, for example, a flash basic input/output system (BIOS), HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SI0) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may he performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS, 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
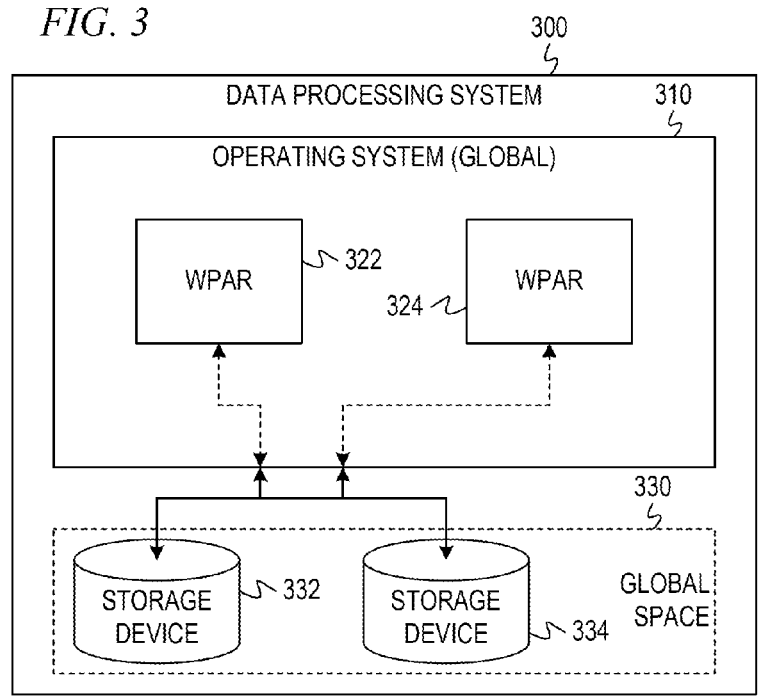
FIG. 3 is a block diagram of a data processing system supporting workload partitions in which aspects of the illustrative embodiments may be implemented.

FIG. 3 is a block diagram of a data processing system supporting workload partitions in which aspects of the illustrative embodiments may be implemented. Data processing system 300 may be any type of data processing system capable of executing a workload partition (WPAR) therein. For example, data processing system 300 may be a server data processing system, such as server 104 in FIG. 1.

Operating system 310 may be a host operating system, referred to as "the global," in that one or more WPARs may be configurable and operable within the scope of operating system 310. WPARs 322, 324 are examples of workload partitions that may operate within the scope of operating system 310.

Global space 330 may include any type and number of resources accessible by operating system 310. As an example, global space 330 may include storage devices 332, 334. These storage devices 332, 334 may include data that is usable by WPAR. 322, WPAR 324, or both WPARs 322, 324. As any example, any data on storage device 332 that is usable by WPAR 322, for example, is in the WPAR space of WPAR 322, but also in global space 310. Accordingly, a WPAR space of WPAR. 322 on storage device 332, for example, is a subset of global space 330. Consequently, data in such a WPAR space is accessible to both WPAR 322 and operating system 310.

The illustrative embodiments define a root volume group (RootVG) WPAR as having the following characteristics. A volume group (VG) is the highest level abstraction used within the logical volume manager (LVM). The volume group gathers together a collection of logical volumes (LV) and physical volumes (PV) into one administrative unit. A volume group is a collection of physical volumes from which a logical volume (i.e., a partition) can be created. The WPAR supports physical storage devices. Once a device, such as storage device 332, for example, is exported to a WPAR, such as WPAR 322, for example, the WPAR has exclusive control over the storage device. The storage device may then be varied on and varied off from within the WPAR without affecting the global 310. The WPAR can then create new logical volumes on the storage device. The WPAR must have its own root volume group in the WPAR space. The WPAR space should look and feel like a standalone machine. That is, the volume group should support the same logical volume (LV) names as on the global machine. By providing this feature, the RootVG WPAR would support a closer environment to that of the global system with the same LVs on the root volume group, which resides on one or more disks in the WPAR space. In addition, a WPAR must be able to boot from its own device.

FIG. 4 depicts an example of logical volume names that a root volume group WPAR supports in accordance with an example embodiment. FIG. 4 shows a set of example logical volume names for file systems for a RootVG WPAR. Thus, for this example, a RootVG WPAR would need to support the LV names shown in FIG. 4 to maintain the look and feel of a stand-alone machine.

The requirements enumerated above boil down to an implementation of an isolated device namespace to allow duplicate/common LV names and separate device configuration database information existing in the global and RootVG WPAR. Because a WPAR and its global environment share the same operating system, the same LV labels and LV names cannot co-exist in the global and the WPAR. The isolation of the WPAR is achieved by maintaining separate device configuration database spaces.

In accordance with an illustrative embodiment, the global initially creates volume groups and logical volume labels uniquely in the global and the default file system. The global populates these logical volumes, such as /usr, /home, /tmp, etc., onto the disk. Once the global exports the disk to a WPAR, the global uses logical volume manager (LVM) control operations to rename the LV names within the WPAR space.

However, adding the information about the disk, the volume group(s), and the file systems to the device configuration database of the WPAR and /dev special files is a chicken-and-egg problem, because the WPAR file system itself is not yet mounted.

To solve this problem, the mechanisms of the illustrative embodiments maintain a scratch file system for each RootVG WPAR. This scratch file system holds a file set to boot the WPAR and populate the disk. The global may boot the WPAR from the scratch file system. Once the global boots the WPAR, the global imports the disk into the WPAR and mounts the root under the /mnt of the scratch file system. The global then merges the device configuration data and the device information onto the device configuration database residing on the WPAR disk (e.g., /mnt/etc/objrepos). Then, the global unmounts the file systems and flips the root mount point of the WPAR from the scratch file system to the disk's root by over mounting the disk's root over the scratch file system.

The global modifies the LV properties of the disk. The global never brings the disk back to the global space. The disk is only operational inside the WPAR space until the end of the WPAR life cycle or the disk is removed from the WPAR.

Figure 5A:
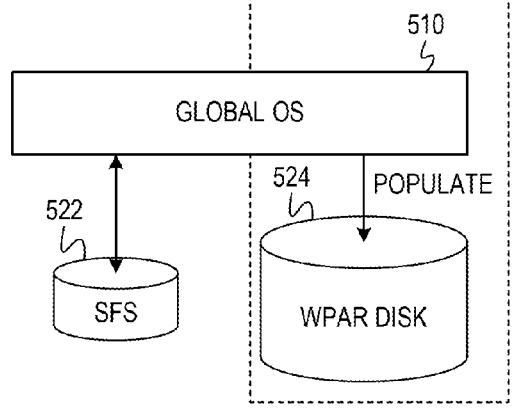
FIGS. 5A-5F are block diagrams depicting operation of a mechanism for isolating device namespace to allow duplicate/common names in a root volume group workload partition in accordance with an illustrative embodiment.

FIGS. 5A-5F are block diagrams depicting operation of a mechanism for isolating device namespace to allow duplicate/common names in a root volume group workload partition in accordance with an illustrative embodiment With reference to FIG. 5A, global operating system 510 maintains scratch file system (SFS) 522, which stores information to create an execution environment for a workload partition (WPAR). Global 510 populates WPAR disk 524 with the root file systems of the WPAR. This is done from the global environment, or global space 530, where a volume group and associated logical volumes (LVs) and file systems are created. The volume groups, LVs, and file systems reside in global space 530 and do not conflict with any existing entries (not shown) in global space 530. That is, global 510 must assign LV names that do not conflict with the file system of global OS 510. Global 510 then populates the file systems on WPAR disk 524 with the necessary file sets for the WPAR.

Figure 5B:
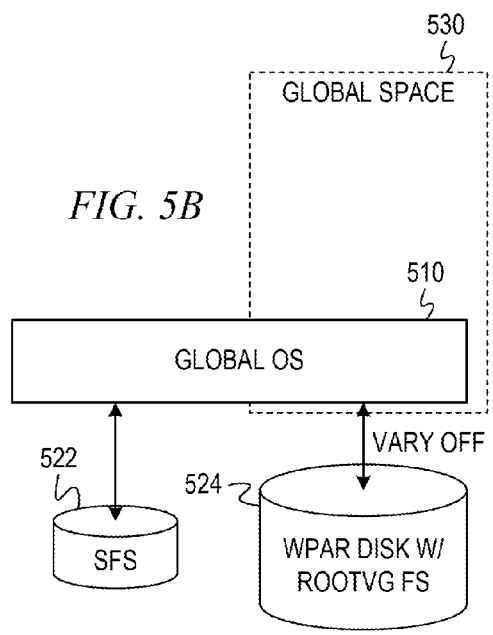
Figure 5C:
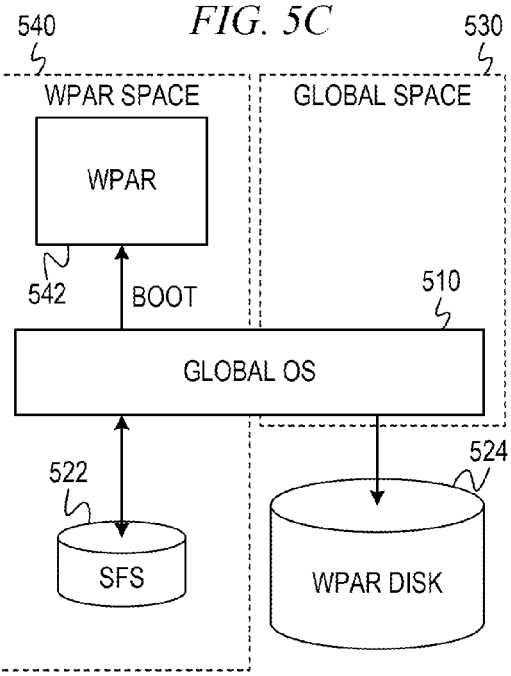
Figure 5D:
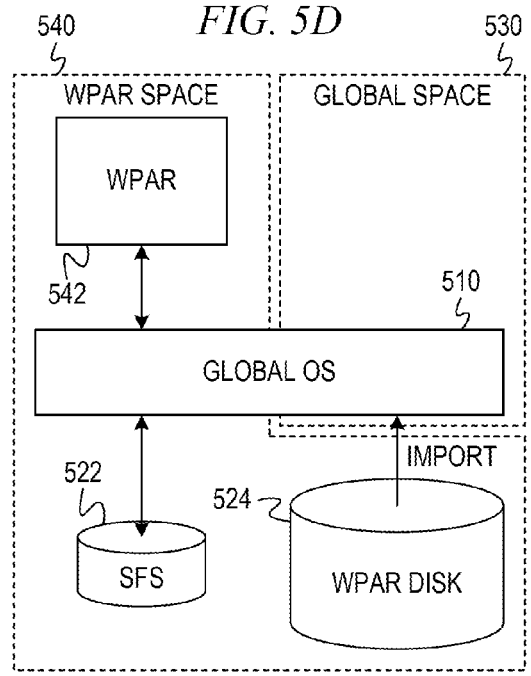

Turning to FIG. 5B, after the global 510 populates the storage device 524, global 510 varies off the root volume group of the WPAR and removes all knowledge of the WPAR volume group and file systems from the global environment 530. Then, as shown in FIG. 5C, the global 510 boots the WPAR 542 using the SFS 522. Booting WPAR 542 creates a WPAR name space 540. As shown in FIG. 5D, global 510 exports resources to be used by WPAR 542 to the WPAR. More particularly, global 510 configures disk 524 using information in SFS 522. This causes the device configuration database of SFS 522 to be updated as well as the /dev special files of the SFS for each of the devices that are exported to WPAR 542. The global 510 identifies WPAR disk 524 as the disk that contains the root volume group of the WPAR 542 and imports disk 524 into the WPAR space 540. This causes the device configuration database of the SFS as well as the /dev special files to now have knowledge of the root volume group, LVs, and file systems that had been created, populated, and then purged in the global environment 530.

Figure 5E:
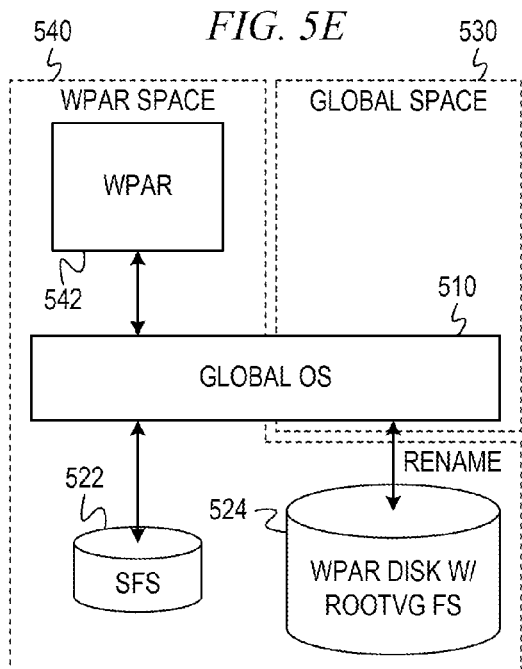

With reference now to FIG. 5E, for the very first boot of the RootVG WPAR, global 510 renames the logical volume names of each of the root file systems in disk 524 by way of logical volume manager (LVM) control operations. Global 510 renames the root file systems to their traditional names, e.g., the logical volume names in FIG. 4. These names were not available for use when the LVs and file systems were initially created in the global environment 530, but are now available in the WPAR environment 540, because the WPAR space 540 is empty on the first boot of the WPAR 542.

Figure 5F:
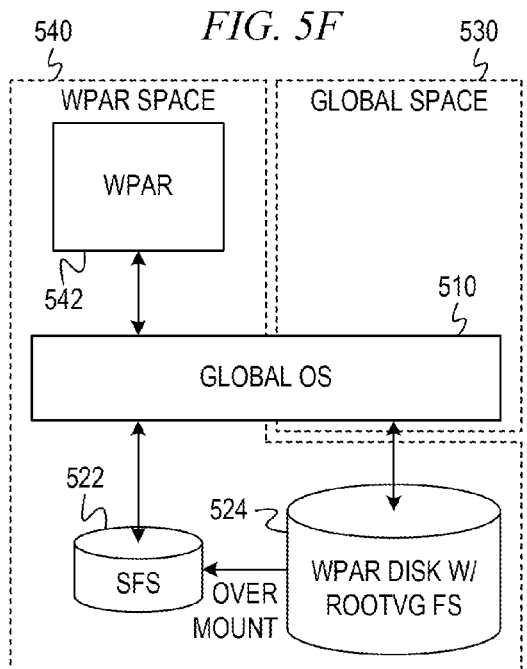

Then, as shown in FIG. 5F, global 510 temporarily mounts the RootVG file system "/" of the root volume group onto /mnt in SFS 522. The global then merges the SFS /dev special files onto the /mnt/dev special file directory. The customized device configuration data is also transferred onto /mnt This technique described above with reference to FIGS. 5A-5F allows the WPAR name space 540 to contain elements that would otherwise be in conflict with the global name space 530.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing, More specific examples (a non-exhaustive list) of the computer readable medium would include the following: an electrical connection having one or more wires, a portable computer diskette, a hard disk., a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc, or any suitable combination thereof.

Computer program code for carrying out operations for aspects of the present invention may be written in any combination of one or more programming languages, including an object oriented programming language such as Java™, Smalltalk™,C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 6 is a flowchart illustrating operation of a mechanism isolating device namespace to allow duplicate/common names in a root volume group workload partition in accordance with an illustrative embodiment. Operation begins, and the mechanism populates the root file systems on the workload partition (WPAR) disk in the global space (block 602). The WPAR disk is the disk that is to be exported to the WPAR and to store the root volume group. The mechanism then merges the device configuration database and device information of a scratch file system (SFS) into the device configuration database redesign on the WPAR disk (block 604). The mechanism then clears the volume group, logical volume, and file system names from the global namespace (block 606).

Then, the mechanism boots the WPAR from the SFS (block 608). The mechanism then configures devices that have been exported to the WPAR (block 610). The mechanism identifies the WPAR disk (block 612) and imports the root volume group into the WPAR name space (block 614). Next, the mechanism renames the logical volume names to the traditional names (block 616).

The mechanism temporarily mounts the root volume group file system onto the SFS (block 618) and merges the SFS special files onto the special files in the root volume group file system (block 620). Then, the mechanism transfers the customized device configuration data (block 622), and operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide a mechanism for isolation of device namespace to allow duplicate or common names in root volume group workload partitions. The mechanism creates a scratch file system that contains enough information to create an execution environment for a workload partition and information about which physical volumes to use for the root volume group file systems. The mechanism then populates the root file systems on a disk in the global space. The mechanism boots the workload partition from the scratch file system and configures the devices to be exported to the workload partition based information in the scratch file system. The mechanism then renames the logical volume names to the traditional names. The mechanism then temporarily mounts the root volume group file system onto the scratch file system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for isolation of device namespace in a root volume group workload partition, the method comprising:

populating, by a global operating system in the data processing system, root file systems on a workload partition disk in a global namespace associated with the global operating system;

clearing, by the global operating system in the data processing system, volume group, logical volume, and file system names for the workload partition disk from the global namespace;

booting, by the global operating system in the data processing system, a workload partition from a scratch file system, wherein the scratch file system stores information for booting the workload partition;

configuring, by the global operating system in the data processing system, the workload partition disk with the root volume group;

importing, by the global operating system in the data processing system, the workload partition disk into a workload partition namespace associated with the workload partition; and renaming, by the global operating system in the data processing system, logical volume names of the root volume group in the workload partition namespace.

2. The method of claim 1, further comprising:
merging object data manager and device information from the scratch file system into device configuration database information residing on the workload partition disk.

3. The method of claim 1, further comprising:
identifying the workload partition disk based on information in the scratch file system.

4. The method of claim 1, further comprising:
mounting the root volume group file system onto the scratch file system.

5. The method of claim 4, further comprising:
merging scratch file system special files onto special files in the root volume group file system.

6. The method of claim 1, wherein clearing volume group, logical volume, and file system names for the workload partition disk from the global namespace comprises varying off the root file systems of the workload partition disk.

7. The method of claim 1, wherein booting the workload partition creates the workload partition namespace.

8. The method of claim 1, wherein configuring the workload partition disk with the root volume group comprises configuring the workload partition disk using information in the scratch file system.

9. A computer program product comprising a non-transitory readable storage medium having a computer readable program stored therein, wherein the computer readable program, when executed on a computing device, causes the computing device to:
populate, by a global operating system in the computing device, root file systems on a workload partition disk in a global namespace associated with the global operating system;
clear, by the global operating system in the computing device, volume group, logical volume, and file system names for the workload partition disk from the global namespace;
boot, by the global operating system in the computing device, a workload partition from a scratch file system, wherein the scratch file system stores information for booting the workload partition;
configure, by the global operating system in the computing device, the workload partition disk with the root volume group;
import, by the global operating system the computing device, the root volume group into a workload partition namespace associated with the workload partition; and
rename, by the global operating system in the computing device, logical volume names of the root volume group in the workload partition namespace.

10. The computer program product of claim 9, wherein the computer readable program further causes the computing device to merge object data manager and device information from the scratch file system into device configuration database information residing on the workload partition disk.

11. The computer program product of claim 9, wherein the computer readable program further causes the computing device to identify the workload partition disk based on information in the scratch file system, 12. The computer program product of claim 9, wherein the computer readable program further causes the computing device to temporarily mount the root volume group file system onto the scratch file system.

13. The computer program product of claim 12, wherein the computer readable program further causes the computing device to merge scratch file system special files onto special files in the root volume group file system.

14. The computer program product of claim 9, wherein clearing volume group, logical volume, and file system names for the workload partition disk from the global namespace comprises varying off the root file systems of the workload partition disk.

15. The computer program product of claim 9, wherein booting the workload partition creates the workload partition namespace.

16. The computer program product of claim 9, wherein configuring the workload partition disk with the root volume group comprises configuring the workload partition disk using information in the scratch file system.

17. The computer program product of claim 9, wherein the computer readable program is stored in a computer readable storage medium in a data processing system and wherein the computer readable program was downloaded over a network from a remote data processing system.

18. The computer program product of claim 9, wherein the computer readable program is stored in a computer readable storage medium in a server data processing system and wherein the computer readable program is downloaded over a network to a remote data processing system for use in a computer readable storage medium with the remote system.

19. An apparatus, comprising:
a processor; and
a memory coupled to the processor, wherein the memory comprises instruction which, when executed by the processor, cause the processor to:
populate, by a global operating system, root file systems on a workload partition disk in a global namespace associated with the global operating system;
clear, by the global operating system, volume group, logical volume, and file system names for the workload partition disk from the global namespace;
boot, by the global operating system, a workload partition from a scratch file system, wherein the scratch file system stores information for booting the workload partition;
configure, by the global operating system, the workload partition disk with the root volume group;
import, by the global operating system, the workload partition disk into a workload partition namespace associated with the workload partition; and
rename, by the global operating system, logical volume names of the root volume group in the workload partition namespace.

20. The apparatus of claim 19, wherein the instructions further cause the processor to temporarily mount the root volume group file system onto the scratch file system.

* * * * *